US011110925B2

(12) United States Patent
Aoki et al.

(10) Patent No.: US 11,110,925 B2
(45) Date of Patent: Sep. 7, 2021

(54) VEHICLE CONTROLLING DEVICE AND VEHICLE HAVING THE SAME

(71) Applicant: HONDA MOTOR CO., LTD., Tokyo (JP)

(72) Inventors: Yoshinori Aoki, Wako (JP); Kohei Hanada, Wako (JP); Tomoyuki Shinmura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 279 days.

(21) Appl. No.: 16/406,460

(22) Filed: May 8, 2019

(65) Prior Publication Data

US 2019/0344789 A1    Nov. 14, 2019

(30) Foreign Application Priority Data

May 10, 2018  (JP) .............................. JP2018-091592

(51) Int. Cl.
*B60W 30/17* (2020.01)
*B60W 10/06* (2006.01)
*B60W 10/18* (2012.01)
*B60W 30/18* (2012.01)

(52) U.S. Cl.
CPC ............ *B60W 30/17* (2013.01); *B60W 10/06* (2013.01); *B60W 10/18* (2013.01); *B60W 30/18018* (2013.01); *B60W 2554/801* (2020.02); *B60W 2554/804* (2020.02); *B60W 2710/06* (2013.01); *B60W 2710/18* (2013.01)

(58) Field of Classification Search
CPC .................................................. B60W 30/17
See application file for complete search history.

(56) References Cited

U.S. PATENT DOCUMENTS

| 7,354,379 | B2* | 4/2008 | Moriya | F02N 11/0833 |
| | | | | 477/199 |
| 8,090,517 | B2* | 1/2012 | Kobayashi | B60K 31/0008 |
| | | | | 701/94 |
| 8,296,041 | B2* | 10/2012 | Yamamura | F02D 41/1497 |
| | | | | 701/110 |
| 9,126,596 | B2* | 9/2015 | Ando | F02N 11/0818 |
| 9,278,680 | B2* | 3/2016 | Seguchi | B60W 10/182 |

(Continued)

FOREIGN PATENT DOCUMENTS

WO    2015118570 A1    8/2015

*Primary Examiner* — Michael A Berns
(74) *Attorney, Agent, or Firm* — Rankin, Hill & Clark LLP

(57) ABSTRACT

A vehicle controlling device includes: a VSA-ECU that performs deceleration control of a host vehicle using an inter-vehicle distance between the host vehicle and another vehicle traveling in front of the host vehicle; and an engine control unit that performs idling stop control of stopping drive of an engine as a driving source of the host vehicle upon satisfying stop conditions including a condition that vehicle speed of the host vehicle enters a predetermined low vehicle speed range and performs restart control of restarting the engine upon satisfying a predetermined restart condition. A power supply mounted on the host vehicle is used in common as a power supply used in executing the deceleration control and a power supply used in executing the restart control. The engine control unit prohibits execution of the idling stop control during execution of the deceleration control.

4 Claims, 5 Drawing Sheets

(56) References Cited

U.S. PATENT DOCUMENTS

| | | | |
|---|---|---|---|
| 9,783,196 B2* | 10/2017 | Tokimasa | B60W 10/18 |
| 9,827,955 B2* | 11/2017 | Miller | B60T 1/10 |
| 9,925,981 B2* | 3/2018 | Asakura | B60W 30/16 |
| 2017/0001640 A1 | 1/2017 | Asakura et al. | |
| 2019/0344789 A1* | 11/2019 | Aoki | B60W 30/18018 |
| 2019/0345887 A1* | 11/2019 | Aoki | B60W 10/06 |

* cited by examiner

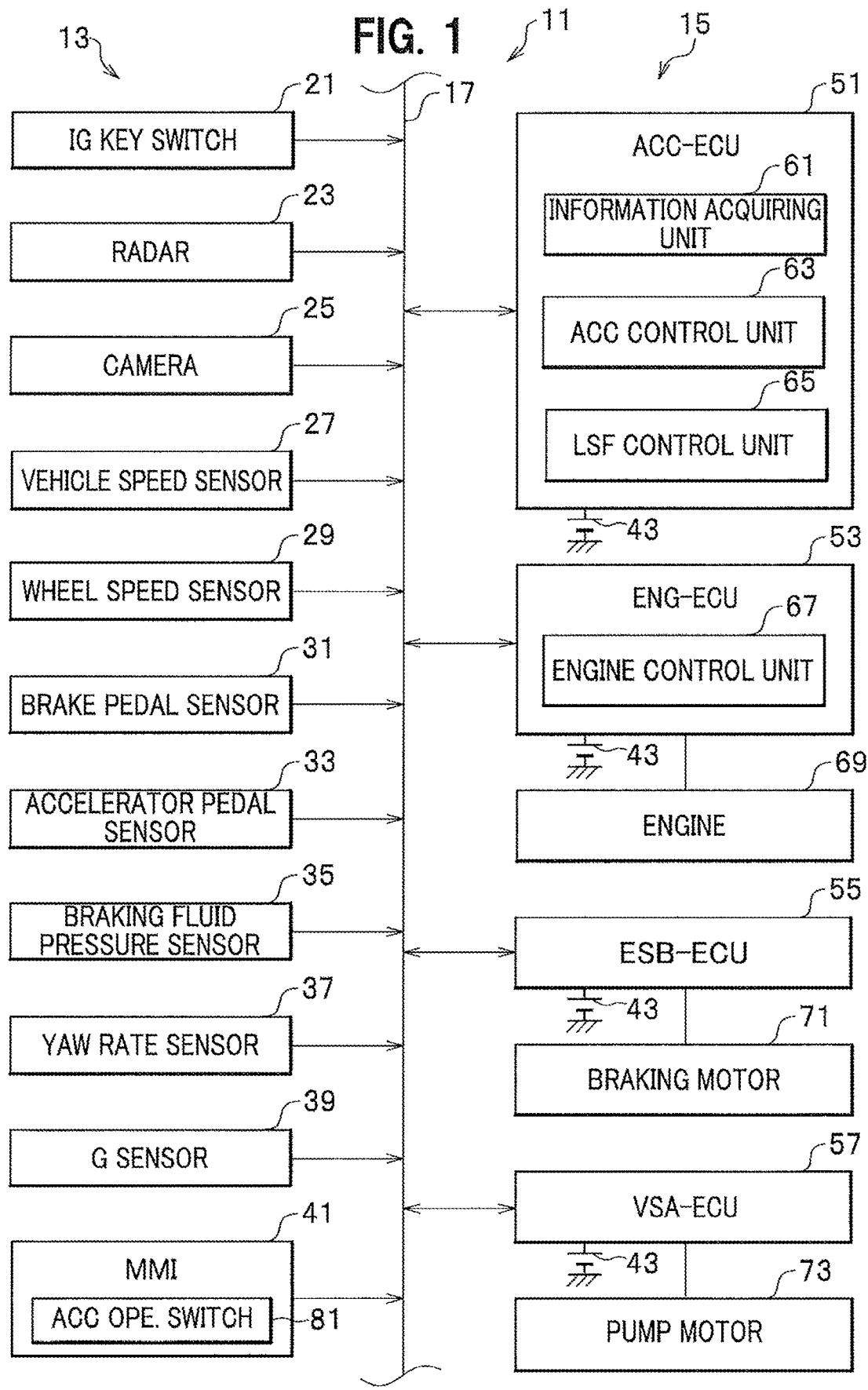

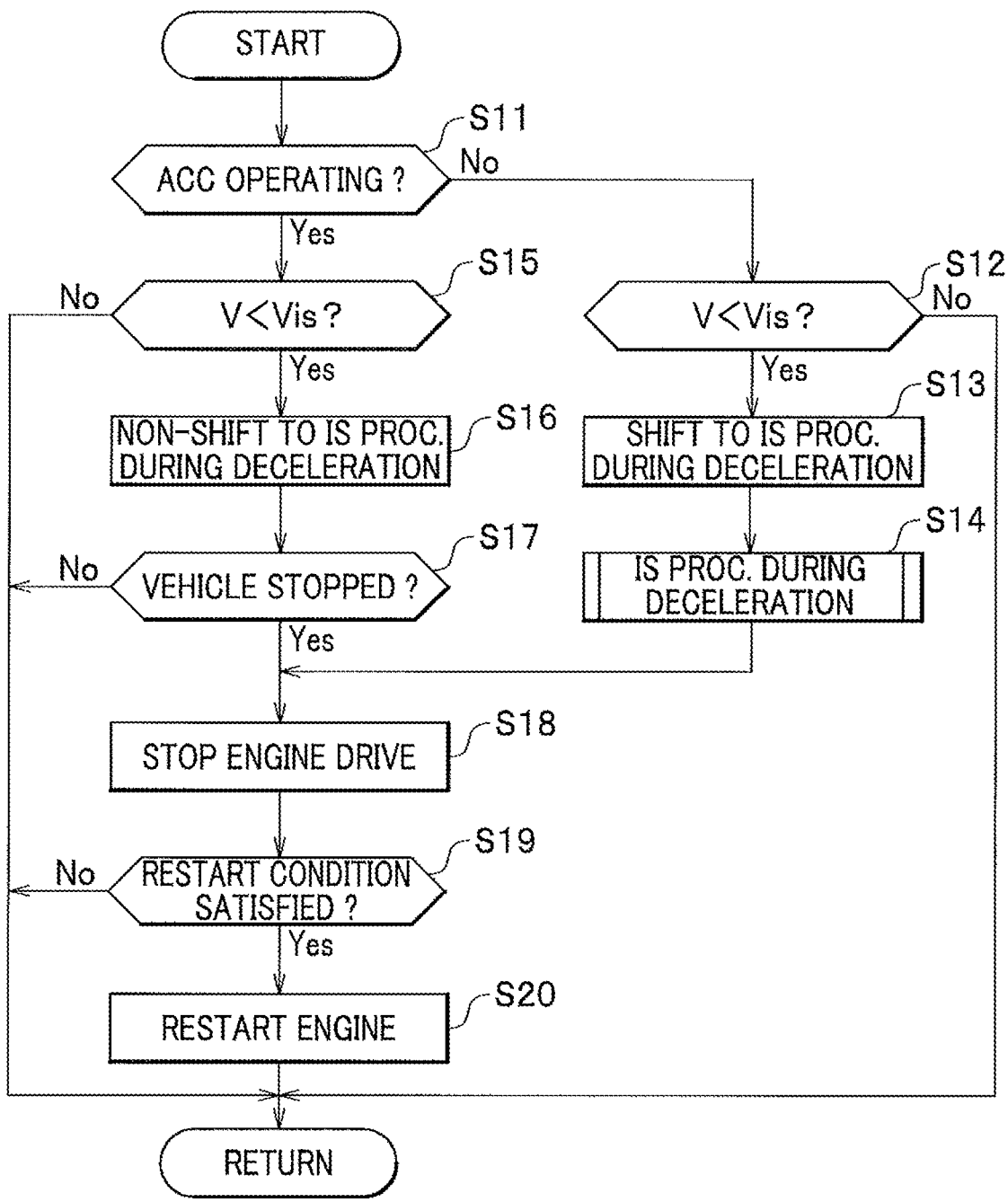

VEHICLE CONTROLLING DEVICE AND VEHICLE HAVING THE SAME

CROSS-REFERENCE TO RELATED APPLICATION

This application is based upon and claims priority from the Japanese Patent Application No. 2018-091592, filed on May 10, 2018, the entire contents of which are incorporated herein by reference.

BACKGROUND OF THE INVENTION

1. Field of the Invention

The present invention relates to a vehicle controlling device having an idling stop function of stopping an engine as a driving source of a host vehicle when predetermined stop conditions are satisfied, and relates to a vehicle having the vehicle controlling device.

2. Description of the Related Art

In order to achieve fuel saving, a reduction in emission, a reduction in vibration noise, and the like, there has been known a vehicle controlling device having an idling stop (hereinafter abbreviated as "IS" in some cases) function of stopping an engine as a driving source of a host vehicle when predetermined stop conditions (e.g., a brake is actuated at vehicle speed of zero) are satisfied.

As an example of such a vehicle controlling device, the applicant discloses an invention of a vehicle controlling device that controls a host vehicle by means of the IS function associated with a following control function of following another vehicle traveling in front of the host vehicle (see, for example, Patent document 1: WO 2015/118570).

The vehicle controlling device described in Patent document 1 includes an engine control unit that stops an engine as a driving source of a host vehicle when predetermined stop conditions are satisfied and restarts the engine when predetermined restart conditions are satisfied; and a following control unit that performs following control of following another vehicle traveling in front of the host vehicle when a predetermined following control condition is satisfied. During operation of the following control by the following control unit, the engine control unit operates to change the stop condition or the restart condition for the engine from the conditions used when the following control is off.

Specifically, for example, when the stop conditions set for the engine when the following control is off includes a condition that a road surface gradient is equal to or smaller than a gradient threshold, the gradient threshold used as the stop condition for the engine is changed to a gentler gradient value during the operation of the following control. That is, when the road surface gradient is used as the stop condition for the engine, stop timing of the engine is delayed during the operation of the following control as compared with the stop timing used when the following control is off.

The vehicle controlling device described in Patent document 1 allows the traveling control of the host vehicle to be performed with the following control and the IS control being associated with each other, thus making it possible to prevent movement of a vehicle, which is unexpected by a driver, for example, on a gradient road.

The vehicle controlling device described in Patent document 1 discloses that the IS control is performed after the host vehicle is stopped (see paragraph 0033 in Patent document 1). However, Patent document 1 neither discloses nor indicates that the IS control is performed when vehicle speed of the host vehicle enters a predetermined low vehicle speed range (IS control during decelerated traveling).

If the IS control is performed when the vehicle speed of the host vehicle enters the predetermined low vehicle speed range, a deceleration request by deceleration control and a restart request for the engine are sometimes concurrently generated during the operation of the following control. Both of the deceleration request by the deceleration control and the restart request for the engine require relatively large power to meet the requests. Therefore, when the deceleration request and the restart request are concurrently generated, it is likely that one of the requests is not met to cause an occupant to feel discomfort.

In this regard, in the vehicle controlling device described in Patent document 1, a situation does not occur in which the deceleration request by the deceleration control and the restart request for the engine are concurrently generated during the operation of the following control. In the vehicle controlling device described in Patent document 1 that performs the IS control after stopping of the host vehicle, the engine is driven during traveling of the host vehicle. Therefore, the restart request for the engine is not generated.

The present invention has therefore been made in view of the above problems, and an object of the invention is to provide a vehicle controlling device capable of preventing a situation in which a deceleration request by deceleration control and a restart request for an engine are concurrently generated, to realize smooth vehicle control without causing an occupant to feel discomfort.

Moreover, another object of the present invention is to provide a vehicle including a vehicle controlling device capable of preventing a situation in which a deceleration request by deceleration control and a restart request for an engine are concurrently generated, to realize smooth vehicle control without causing an occupant to feel discomfort.

SUMMARY OF THE INVENTION

In order to attain the above object, according to an aspect of the present invention, a vehicle controlling device reflecting one aspect of the present invention includes: a deceleration control unit that performs deceleration control of a host vehicle using an inter-vehicle distance between the host vehicle and another vehicle traveling in front of the host vehicle; and an engine control unit that performs idling stop control of stopping drive of an engine as a driving source of the host vehicle upon satisfying stop conditions including a condition that vehicle speed of the host vehicle enters a predetermined low vehicle speed range and performs restart control of restarting the engine upon satisfying a predetermined restart condition. A power supply mounted on the host vehicle is used in common as a power supply used in executing the deceleration control and a power supply used in executing the restart control. The engine control unit prohibits execution of the idling stop control during the execution of the deceleration control.

The vehicle controlling device according to one aspect of the present invention makes it possible to prevent a situation in which a deceleration request by deceleration control and a restart request for an engine are concurrently generated, to realize smooth vehicle control without causing an occupant to feel discomfort.

BRIEF DESCRIPTION OF THE DRAWINGS

The features and advantages provided by one or more embodiments of the invention will become apparent from the detailed description given below and appended drawings which are given only by way of illustration, and thus are not intended as a definition of the limits of the present invention.

FIG. 1 is a block configuration diagram showing an overview of a vehicle controlling device according to an embodiment of the present invention;

FIG. 3 is a flowchart for explanation of the operation of the vehicle controlling device according to the embodiment of the present invention;

FIG. 5 is a time chart showing changes over time of the vehicle speed, the engine speed, the idling stop control state, the ACC_SET state, the braking state, and the idling stop prohibition flag, respectively, for explanation of the operation of the vehicle controlling device at the time when the adaptive cruise control function is on.

DETAILED DESCRIPTION OF THE EMBODIMENTS

Figure 2A:
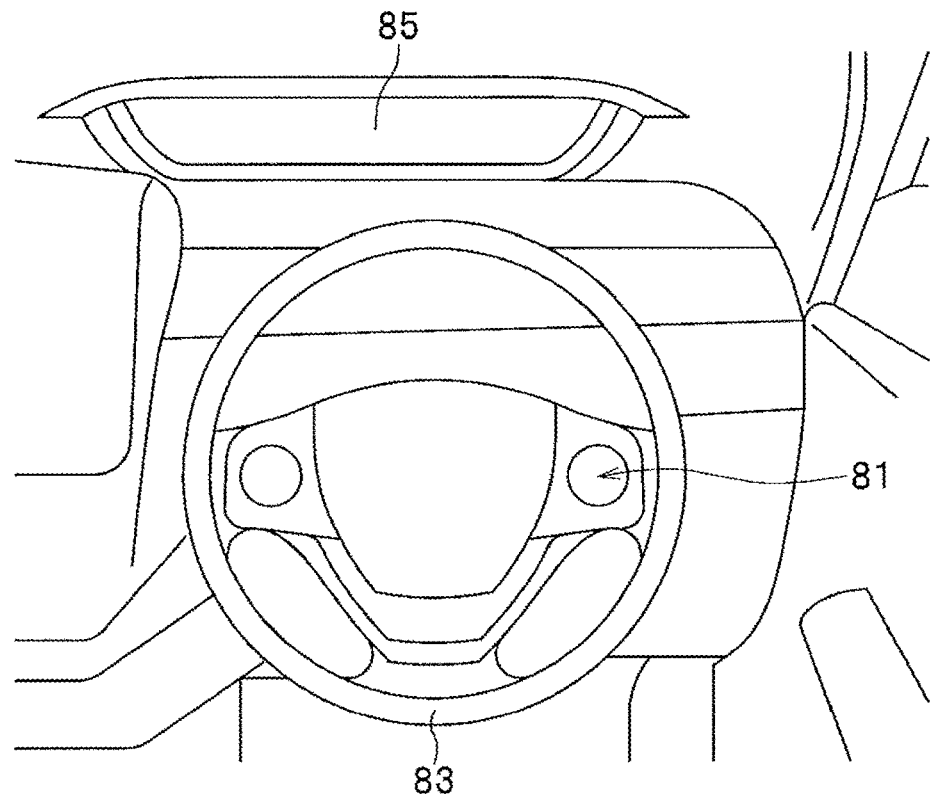
FIG. 2A is an exterior view of an operation switch for an adaptive cruise control function provided in a steering wheel.

A vehicle controlling device according to an embodiment of the present invention is explained in detail below with reference to the drawings as appropriate.

In the figures referred to below, in principle, common reference numerals and signs are given to members having common functions or members having functions corresponding to one another. For convenience of explanation, sizes and shapes of members are sometimes deformed or exaggerated and schematically shown.

Overview of a Vehicle Controlling Device 11 According to an Embodiment of the Present Invention First, an overview of a vehicle controlling device 11 according to an embodiment of the present invention is explained with reference to FIG. 1. FIG. 1 is a block configuration diagram showing the overview of the vehicle controlling device 11 according to the embodiment of the present invention.

The vehicle controlling device 11 according to the embodiment of the present invention has a function of preventing a situation in which a deceleration request by an adaptive cruise control (ACC) function and a restart request for an internal combustion engine 69 (see FIG. 1) as a driving source of a host vehicle (not shown in FIG. 1) are concurrently generated and realizing smooth vehicle control without causing an occupant of the vehicle to feel discomfort. The ACC function is explained in detail below.

In order to realize the function, the vehicle controlling device 11 according to the embodiment of the present invention is configured by connecting an input system element 13 and an output system element 15 to be capable of performing data communication via a communication medium 17 such as a CAN (Controller Area Network) as shown in FIG. 1.

The input system element 13 includes, as shown in FIG. 1, an ignition (IG) key switch 21, a radar 23, a camera 25, a vehicle speed sensor 27, a wheel speed sensor 29, a brake pedal sensor 31, an accelerator pedal sensor 33, a braking fluid pressure sensor 35, a yaw rate sensor 37, a G sensor 39, and an MMI (Man-Machine Interface) 41.

On the other hand, the output system element 15 includes, as shown in FIG. 1, an ACC-ECU 51, an ENG-ECU 53, an ESB (Electric Servo Brake)—ECU 55, and a VSA (Vehicle Stability Assist; VSA is a registered trademark)—ECU 57.

The ignition (IG) key switch 21 is a switch operated when electric power is supplied to units of electric components mounted on the vehicle via a vehicle-mounted battery 43. When the IG key switch 21 is turned on, electric power is supplied to the ACC-ECU 51, the ENG-ECU 53, the ESB-ECU 55, and the VSA-ECU 57. The ECUs 51, 53, 55, and 57 are respectively started.

The radar 23 has a function of irradiating a radar wave on a target including another vehicle traveling in front of the host vehicle and, on the other hand, receiving the radar wave reflected on the target to thereby acquire distribution information of the target including a distance to the target and a direction of the target.

As the radar 23, for example, a laser radar, a microwave radar, a millimeter wave radar, and an ultrasonic radar can be used as appropriate. The radar 23 is provided in a front grill rear part of the host vehicle. The distribution information of the target acquired by the radar 23 is sent to the ACC-ECU 51 via the communication medium 17.

The camera 25 has an optical axis inclined obliquely downward in the front of the host vehicle and has a function of capturing an image in a traveling direction of the host vehicle. As the camera 25, for example, a CMOS (Complementary Metal Oxide Semiconductor) camera and a CCD (Charge Coupled Device) camera can be used as appropriate. The camera 25 is provided in a windshield center upper part or the like of the host vehicle. Traveling direction image information of the host vehicle captured by the camera 25 is sent to the ACC-ECU 51 via the communication medium 17 as an image signal generated by, for example, an interlace scheme of the NTSC (National Television Standards Committee).

The vehicle speed sensor 27 has a function of detecting traveling speed (vehicle speed) V of the vehicle. Information related to the vehicle speed V detected by the vehicle speed sensor 27 is sent to the ESB-ECU 55 and the like via the communication medium 17.

The wheel speed sensor 29 has a function of respectively detecting rotating speed (wheel speed) of each of wheels (not shown in FIG. 1) provided in the host vehicle. Information related to the wheel speed of each of the wheels respectively detected by the wheel speed sensor 29 is sent to the VSA-ECU 57 and the like via the communication medium 17.

The brake pedal sensor 31 has a function of detecting an operation amount of a brake pedal (not shown in FIG. 1) by a driver and torque of the brake pedal. Information related to the operation amount and the torque of the brake pedal detected by the brake pedal sensor 31 is sent to the ESB-ECU 55 via the communication medium 17.

The accelerator pedal sensor 33 has a function of detecting an operation amount of an accelerator pedal (not shown in FIG. 1) by the driver. Information related to the operation amount of the accelerator pedal detected by the accelerator pedal sensor 33 is sent to the VSA-ECU 57 and the like via the communication medium 17.

The braking fluid pressure sensor 35 has a function of detecting a braking fluid pressure in a fluid supply path of a VSA device (a vehicle behavior stabilizing device; not shown in FIG. 1) in a braking fluid pressure system. Information concerning the fluid pressure in the fluid supply path of the VSA device detected by the braking fluid pressure sensor 35 is sent to the ESB-ECU 55 and the like via the communication medium 17.

The yaw rate sensor 37 has a function of detecting a yaw rate generated in the host vehicle. Information related to the yaw rate detected by the yaw rate sensor 37 is sent to the VSA-ECU 57 and the like via the communication medium 17.

The G sensor 39 has a function of respectively detecting front-rear G (front-rear acceleration and deceleration) and lateral G (lateral acceleration and deceleration) generated in the host vehicle. Information related to the front-rear G and the lateral G of the host vehicle detected by the G sensor 39 is sent to the VSA-ECU 57 and the like via the communication medium 17.

The MMI (Man-Machine Interface) 41 includes an operation switch 81 for an adaptive cruise control (ACC) function (hereinafter referred to as "ACC operation switch") (see FIGS. 2A and 2B). The ACC operation switch 81 is used when setting information related to the ACC function is input. The setting information related to the ACC function input by the ACC operation switch 81 is sent to the ACC-ECU 51 and the like via the communication medium 17.

A peripheral configuration of the ACC operation switch 81 is explained with reference to FIGS. 2A and 2B. FIG. 2A is an exterior view of the ACC operation switch 81 provided in a steering wheel 83. FIG. 2B is an exterior view enlarging and showing the ACC operation switch 81.

The ACC operation switch 81 is provided in, for example, a steering wheel 83 as shown in FIG. 2A. A multi information display 85 for displaying the setting information related to the ACC function besides vehicle speed and a shift position is provided near an extended line of a line of sight of the driver forward in the traveling direction.

The adaptive cruise control (ACC) function is explained.

The ACC function is a function of performing, when a predetermined following control condition is satisfied, traveling control of the host vehicle to follow another vehicle (a preceding vehicle) traveling in front of the host vehicle. In cruise control in the past, if required vehicle speed V is set in advance, the host vehicle performs following traveling while keeping the vehicle speed V of the host vehicle at the set vehicle speed.

On the other hand, in addition to a function of keeping the vehicle speed V of the host vehicle at the set vehicle speed, the adaptive cruise control (ACC) has a function of, if a required inter-vehicle distance is set in advance, performing following traveling while keeping an inter-vehicle distance between the host vehicle and another vehicle (a preceding vehicle) traveling in front of the host vehicle at the set inter-vehicle distance in a state in which the vehicle speed V of the host vehicle is maintained in a range of the set vehicle speed.

For example, a scene is assumed in which the host vehicle in ACC operation is involved in congestion during traveling on an expressway and travels at low speed of 30 km/h. In such a scene, the vehicle speed V of the host vehicle is lower than a set speed (e.g., 80 km/h). In this case, if a function of performing following traveling while keeping an inter-vehicle distance between the host vehicle and another vehicle (a preceding vehicle) traveling in front of the host vehicle at a set inter-vehicle distance can be used, a burden of driving can be reduced and convenience is improved.

In response to such a demand, the ACC has a function called LSF (Low Speed Following). The LSF function is a function of performing following control including acceleration control and deceleration control without requiring operation of the accelerator pedal and the brake pedal to keep an inter-vehicle distance between the host vehicle and a preceding vehicle at a set inter-vehicle distance during low speed (e.g., 30 km/h) traveling in which the vehicle speed V of the host vehicle is lower than set speed (e.g., 80 km/h) such as congestion traveling on an expressway.

Figure 2B:
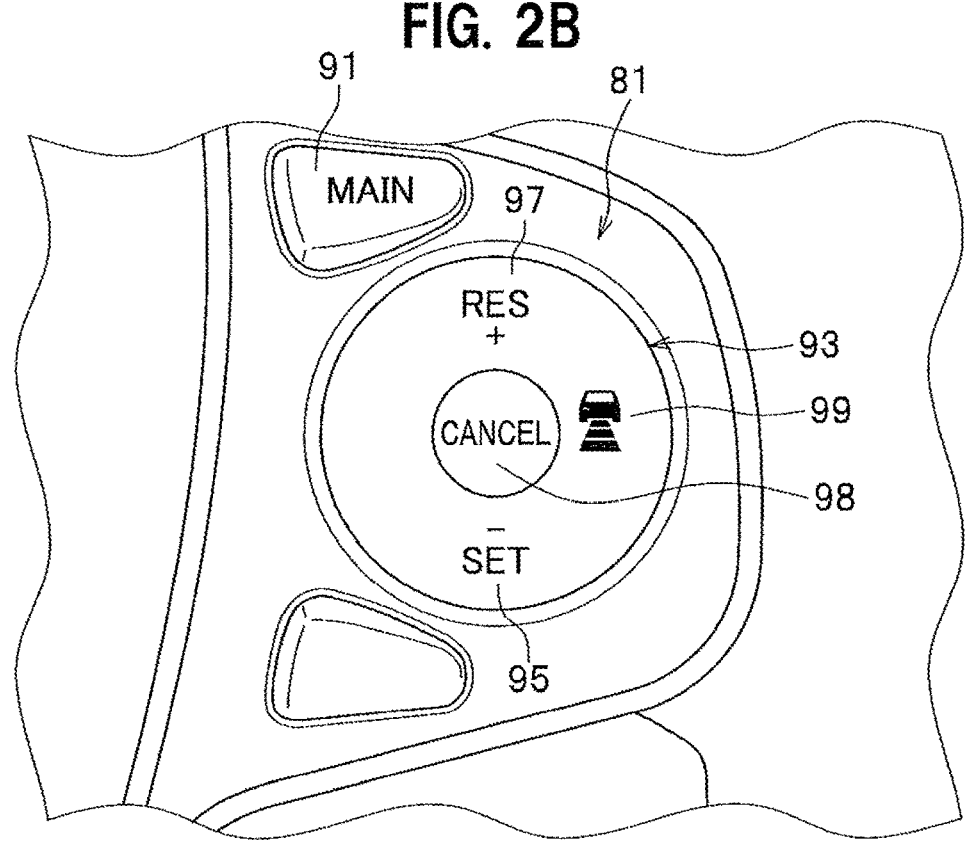
FIG. 2B is an exterior view enlarging and showing the operation switch for the adaptive cruise control function.

In order to input setting information related to the ACC function, the ACC operation switch 81 includes, as shown in FIG. 2B, a main (MAIN) switch 91 and a circle menu switch 93. The main switch 91 is a switch operated when the ACC function is started.

The circle menu switch 93 is a switch operated when the setting information related to the ACC function is input.

The circle menu switch 93 includes, as shown in FIG. 2B, a set (−SET) switch 95, a reset (RES+) switch 97, a cancel (CANCEL) switch 98, and a distance switch 99.

The set (−SET) switch 95 is a switch operated when, in the setting information related to the ACC function, vehicle speed is set and set vehicle speed is adjusted to be reduced.

The reset (RES+) switch 97 is a switch operated when, in the setting information related to the ACC function, vehicle speed is reset and set vehicle speed is adjusted to be increased.

The cancel (CANCEL) switch 98 is a switch operated when the operation of the ACC function is released. The operation of the ACC function can also be released by pressing the main switch 91.

The distance switch 99 is a switch operated when an inter-vehicle distance between the host vehicle and a preceding vehicle is set. Setting information of the inter-vehicle distance is sequentially switched, for example, in four stages of longest, long, medium, and short every time the distance switch 99 is pressed. A setting value of the inter-vehicle distance is set to fluctuate such that the setting value of the inter-vehicle distance decreases as the vehicle speed V decreases according to a level of the vehicle speed V of the host vehicle.

The ACC-ECU 51 belonging to the output system element 15 includes, as shown in FIG. 1, an information acquiring unit 61, an ACC control unit 63, and an LSF control unit 65.

The ACC-ECU 51 is configured by a microcomputer including a CPU (Central Processing Unit), a ROM (Read Only Memory), and a RAM (Random Access Memory). The microcomputer operates to readout and execute programs and data stored in the ROM and perform execution control of various functions including an acquiring function for various kinds of information, an ACC control function, and an LSF control function of the ACC-ECU 51.

The information acquiring unit 61 has a function of acquiring various kinds of information such as distribution information of targets acquired by the radar 23, traveling direction image information of the host vehicle captured by the camera 25, information related to the vehicle speed V detected by the vehicle speed sensor 27, and setting information related to the ACC function input via the ACC operation switch 81 belonging to the MMI (Man-Machine Interface) 41.

The ACC control unit 63 has a function of performing, in a state in which the vehicle speed V of the host vehicle is maintained within a range of set vehicle speed, performing following control including acceleration control and deceleration control without requiring operation of the accelerator pedal and the brake pedal while keeping an inter-vehicle distance between the host vehicle and a preceding vehicle at a set inter-vehicle distance.

The LSF control unit 65 has a function of performing following control including acceleration control and deceleration control without requiring operation of the accelerator pedal and the brake pedal to keep an inter-vehicle distance between the host vehicle and a preceding vehicle at a set inter-vehicle distance during low speed (e.g., 30 Km/h) traveling in which the vehicle speed V of the host vehicle is lower than set speed (e.g., 80 km/h) such as congestion traveling on an expressway.

The ENG-ECU 53 includes an engine control unit 67.

The ENG-ECU 53 is configured by a microcomputer including a CPU (Central Processing Unit), a ROM (Read Only Memory), and a RAM (Random Access Memory). The microcomputer operates to readout and execute programs and data stored in the ROM and perform execution control of various functions including an engine control function of the ENG-ECU 53.

The engine control unit 67 has a function of controlling drive of the engine 69 according to, for example, a step-in amount of the accelerator pedal. In detail, the engine control unit 67 controls a throttle valve (not shown in FIG. 1) that adjusts an intake amount of the engine 69, an injector (not shown in FIG. 1) that injects fuel gas, and an ignition plug (not shown in FIG. 1) that performs ignition of fuel.

The engine control unit 67 has an idling stop function of stopping the engine 69 as a driving source of the host vehicle when stop conditions are satisfied. As the "stop conditions", it is possible to employ, for example, conditions that the vehicle speed V of the host vehicle is in a low vehicle speed range (the vehicle speed V<a vehicle threshold Vis), the brake pedal is stepped in, and the accelerator pedal is not stepped in. When the stop conditions serving as a trigger in performing stop control of the engine 69 are satisfied, the engine control unit 67 regards, in principle, that the driver has a driving intension of stopping the drive of the engine 69. The engine control unit 67 performs control of stopping the drive of the engine 69.

The engine control unit 67 has a function of restarting the engine 69 when a predetermined restart condition is satisfied. As the "restart condition", it is possible to employ, for example, a condition that the accelerator pedal is stepped in or a condition that a foot is released from the brake pedal.

The ESB-ECU 55 is configured by a microcomputer including a CPU (Central Processing Unit), a ROM (Read Only Memory), and a RAM (Random Access Memory). The microcomputer operates to readout and execute programs and data stored in the ROM and perform execution control of various functions including a braking force control function of the ESB-ECU 55.

The ESB-ECU 55 has a function of generating braking fluid pressure (secondary fluid pressure) by operating a motor cylinder device (see, for example, Japanese Patent Application Laid-Open No. 2015-110378; not shown in FIG. 1) with driving of a braking motor 71 according to braking fluid pressure generated by a mass cylinder (not shown in FIG. 1).

The VSA-ECU 57 is configured by a microcomputer including a CPU (Central Processing Unit), a ROM (Read Only Memory), and a RAM (Random Access Memory). The microcomputer operates to readout and execute programs and data stored in the ROM and perform execution control of various functions including a braking control function based on the ACC operation and a vehicle posture stabilizing function of the VSA-ECU 57.

The VSA-ECU 57 has a function of receiving a deceleration control command by action of the LSF control unit 65 and controlling a braking force of four wheels to a braking force corresponding to target fluid pressure of each of the wheels by, for example, driving a pressurizing pump (not shown in FIG. 1) using a pump motor 73. The VSA-ECU 57 is equivalent to a "deceleration control unit" of the present invention.

Operation of the Vehicle Controlling Device 11 According to the Embodiment of the Present Invention The operation of the vehicle controlling device 11 according to the embodiment of the present invention is explained with reference to FIG. 3. FIG. 3 is a flowchart served for operation explanation of the vehicle controlling device 11 according to the embodiment of the present invention.

In step S11 in FIG. 3, the ACC-ECU 51 determines whether the ACC is operating. The determination concerning whether the ACC is operating is performed according to whether predetermined following control conditions are satisfied. As the predetermined following control conditions, it is possible to employ conditions, for example, that the main switch 91 is turned on and setting information related to the ACC function (the vehicle speed V and an inter-vehicle distance between the host vehicle and a preceding vehicle) is set.

As a result of the determination in step S11, when it is determined that the ACC is not operating (No in step S11), the ACC-ECU 51 advances a flow of the processing to the next step S12. On the other hand, as a result of the determination in step S11, when it is determined that the ACC is operating (Yes in step S11), the ACC-ECU 51 jumps the flow of the processing to step S15.

In step S12, the ENG-ECU 53 receiving, from the ACC-ECU 51, information that the ACC is not operating determines whether the vehicle speed V of the host vehicle is smaller than a predetermined vehicle speed threshold Vis. As the predetermined vehicle speed threshold Vis, it is possible to employ, as appropriate, a low vehicle speed value (e.g., approximately 10 Km/h) at which the host vehicle can be regarded as being on the way to stopping.

As a result of the determination in step S12, when it is determined that the vehicle speed V of the host vehicle is smaller than the vehicle speed threshold Vis (Yes in step S12), the ENG-ECU 53 advances the flow of the processing to the next step S13. On the other hand, as a result of the determination in step S12, when it is determined that the vehicle speed V of the host vehicle is not smaller than the vehicle speed threshold Vis (No in step S12), the ENG-ECU 53 advances the flow of the processing to a return terminal.

In step S13, the engine control unit 67 of the ENG-ECU 53 shifts a driving mode of the engine 69 to IS processing during deceleration. The IS processing during deceleration is a processing mode for regarding that the host vehicle is on the way to stopping when the vehicle speed V of the host vehicle is reduced to fall below the vehicle threshold Vis, and stopping the drive of the engine 69 before the host vehicle is stopped.

In step S14, the engine control unit 67 of the ENG-ECU 53 performs the IS processing during deceleration for stopping the drive of the engine 69 before the stop of the host vehicle.

In step S15, as in step S12, the ENG-ECU 53 receiving, from the ACC-ECU 51, information that the ACC is operating as a result of the determination in step S11 performs the determination concerning whether the vehicle speed V of the host vehicle is smaller than the predetermined vehicle speed threshold Vis (enters the low vehicle speed range).

As a result of the determination in step S15, when it is determined that the vehicle speed V of the host vehicle is smaller than the vehicle speed threshold Vis (enters the low vehicle speed range) (Yes in step S15), the ENG-ECU 53 advances the flow of the processing to step S16. On the other hand, as a result of the determination in step S15, when it is determined that the vehicle speed V of the host vehicle is not smaller than the vehicle speed threshold Vis (does not enter the low vehicle speed range) (No in step S15), the ENG-ECU 53 advances the flow of the processing to the return terminal.

In step S16, the engine control unit 67 of the ENG-ECU 53 does not shift the driving mode of the engine 69 to the IS processing during deceleration. As a result, in the flow of the processing in step S16 and subsequent steps, the drive of the engine 69 is not stopped before the stop of the host vehicle. An IS prohibition flag is used in order not to shift the driving mode of the engine 69 to the IS processing during deceleration. The IS prohibition flag is explained in detail below.

In step S17, the ACC-ECU 51 determines whether the host vehicle stops.

As a result of the determination in step S17, when it is determined that the host vehicles stops (Yes in step S17), the ACC-ECU 51 advances the flow of the processing to the next step S18. On the other hand, as a result of the determination in step S17, when it is determined that the host vehicle does not stop yet (No in step S17), the ACC-ECU 51 advances the flow of the processing to the return terminal.

In step S18, the engine control unit 67 of the ENG-ECU 53 receiving, from the ACC-ECU 51, information that the host vehicle stops performs control of stopping the drive of the engine 69. Consequently, the drive of the engine 69 is stopped.

In step S19, the engine control unit 67 of the ENG-ECU 53 determines whether a restart condition for the engine 69 is satisfied. For example, when information that the foot is released from the brake pedal is acquired by the brake pedal sensor 31, it is determined that the restart condition for the engine 69 is satisfied.

As a case where the restart condition for the engine 69 is satisfied, it is possible to set, as appropriate besides a case where the foot is released from the brake pedal, any of various cases in which an intention to start the host vehicle can be noticed such as a case where the acceleration pedal is stepped in, a case where a steering switch is operated, and a case where steering torque exceeding a predetermined value is applied to the steering wheel.

As a result of the determination in step S19, when it is determined that the restart condition for the engine 69 is satisfied (Yes in step S19), the ENG-ECU 53 advances the flow of the processing to the next step S20. On the other hand, as a result of the determination in step S19, when it is determined that the restart condition for the engine 69 is not satisfied (No in step S19), the ENG-ECU 53 advances the flow of the processing to the return terminal.

In step S20, the engine control unit 67 of the ENG-ECU 53 performs restart of the engine 69. Consequently, the engine 69 is restarted.

Time Series Operation of the Vehicle Controlling Device 11 According to the Embodiment of the Present Invention A time series operation of the vehicle controlling device 11 according to the embodiment of the present invention is explained with reference to FIGS. 4 and 5.

First, a time series operation of the vehicle controlling device 11 at the time when the adaptive cruise control (ACC) function is off is explained with reference to FIG. 4 as appropriate.

Figure 4:
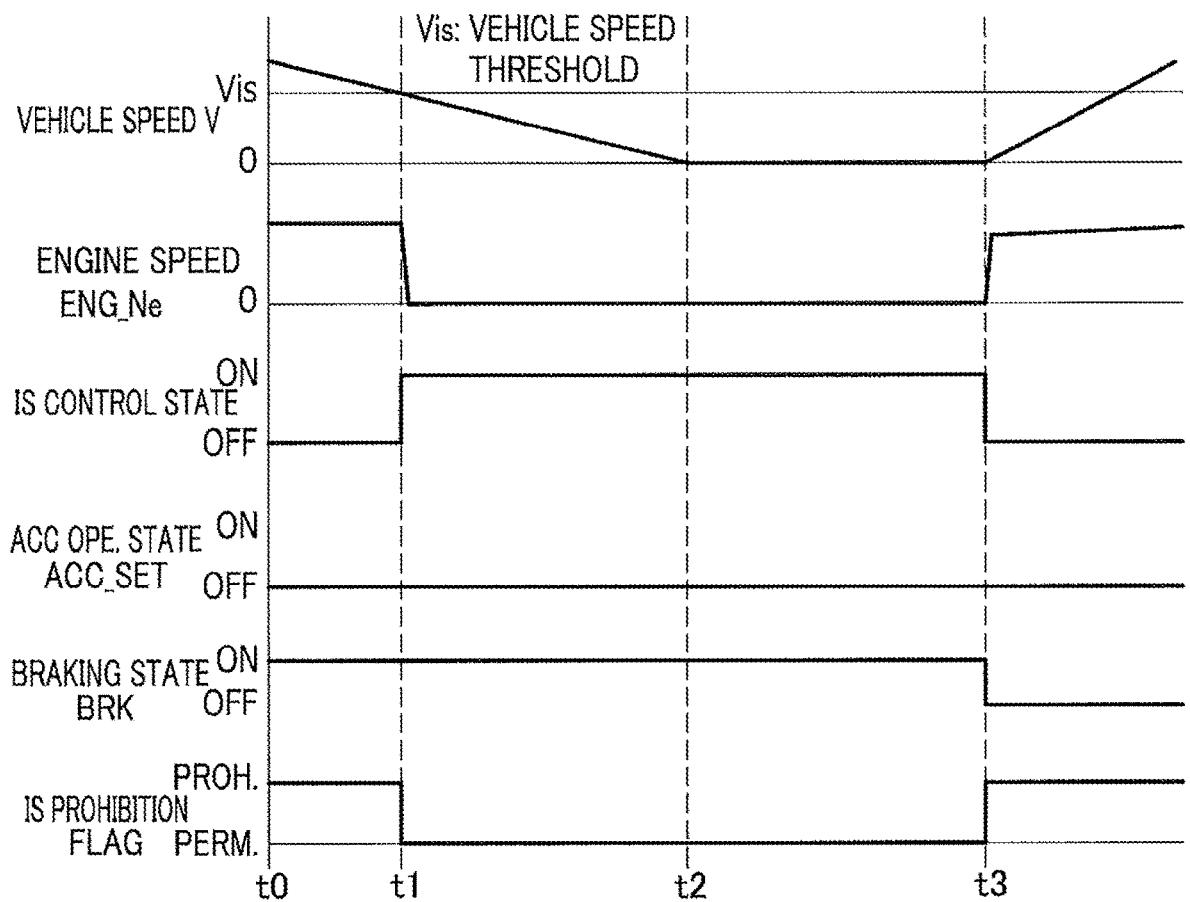
FIG. 4 is a time chart showing changes over time of vehicle speed, engine speed, an idling stop control state, an ACC_SET state, a braking state, and an idling stop prohibition flag, respectively, for explanation of the operation of the vehicle controlling device at the time when the adaptive cruise control function is off.

FIG. 4 is a time chart respectively showing changes over time of the vehicle speed V, engine speed ENG_Ne, an IS control state, an ACC operation state ACC_SET, a braking state BRK, and an idling stop prohibition flag served for explanation of the operation of the vehicle controlling device 11 at the time when the adaptive cruise control (ACC) function is off.

At time t0 to t1 shown in FIG. 4, the vehicle speed V of the host vehicle linearly gradually decreases from a value exceeding the vehicle speed threshold Vis to enter the low vehicle speed range in which the vehicle speed threshold Vis is an upper limit. At this time, the engine speed ENG_Ne maintains idling rotation speed. The IS control state indicating an ON/OFF state of idling stop control is in the OFF state. The ACC operation state ACC_SET is also in an OFF state. The braking state BRK representing a step-in state of the brake pedal is in an ON state (a state in which the brake pedal is stepped in). The IS prohibition flag representing a control state concerning whether idling stop should be prohibited or permitted is in a prohibition state.

At time t1 to t2, even after entering, at time t1, the low vehicle speed range in which the vehicle speed threshold Vis is the upper limit, the vehicle speed V of the host vehicle linearly gradually decreases until the vehicle speed V decreases to zero (a stopped state) at time t2. At this time, the engine speed ENG_Ne drops to zero at a time immediately after time t1. Thereafter, the engine speed ENG_Ne maintains a zero state (a drive stop state of the engine 69). The IS control state transitions from the OFF state to the ON state and thereafter maintains the ON state. The ACC operation state ACC_SET is in the OFF state. The braking state BRK is in the ON state (the state in which the brake pedal is stepped in). The IS prohibition flag transitions from the prohibition state to a permission state and thereafter maintains the permission state. At time t2 to t3, the vehicle speed V of the host vehicle maintains zero (the stopped state). At this time, the engine speed ENG_Ne also maintains the zero state (the drive stop state of the engine 69). The IS control state is in the ON state. The ACC operation state ACC_SET is in the OFF state. The braking state BRK is in the ON state (the brake pedal is stepped in). The IS prohibition flag is in the permission state.

At time t3 and subsequent time, the vehicle speed V of the host vehicle linearly gradually increases from zero (the stopped state). At this time, the engine speed ENG_Ne increases to the idling rotation speed at a time immediately after time t3 and thereafter maintains speed near the idling rotation speed. The IS control state transitions from the ON state to the OFF state at time t3 and thereafter maintains the OFF state. The ACC operation state ACC_SET is in the OFF state. The braking state BRK transitions from the ON state (the state in which the brake pedal is stepped in) to an OFF state (a state in which the foot is released from the brake pedal) at time t3 and thereafter maintains the Off state. The IS prohibition flag transitions from the permission state to the prohibition state at time t3 and thereafter maintains the prohibition state.

A time series operation of the vehicle controlling device 11 at the time when the adaptive cruise control (ACC) function is on is explained with reference to FIG. 5 as appropriate.

Figure 5:
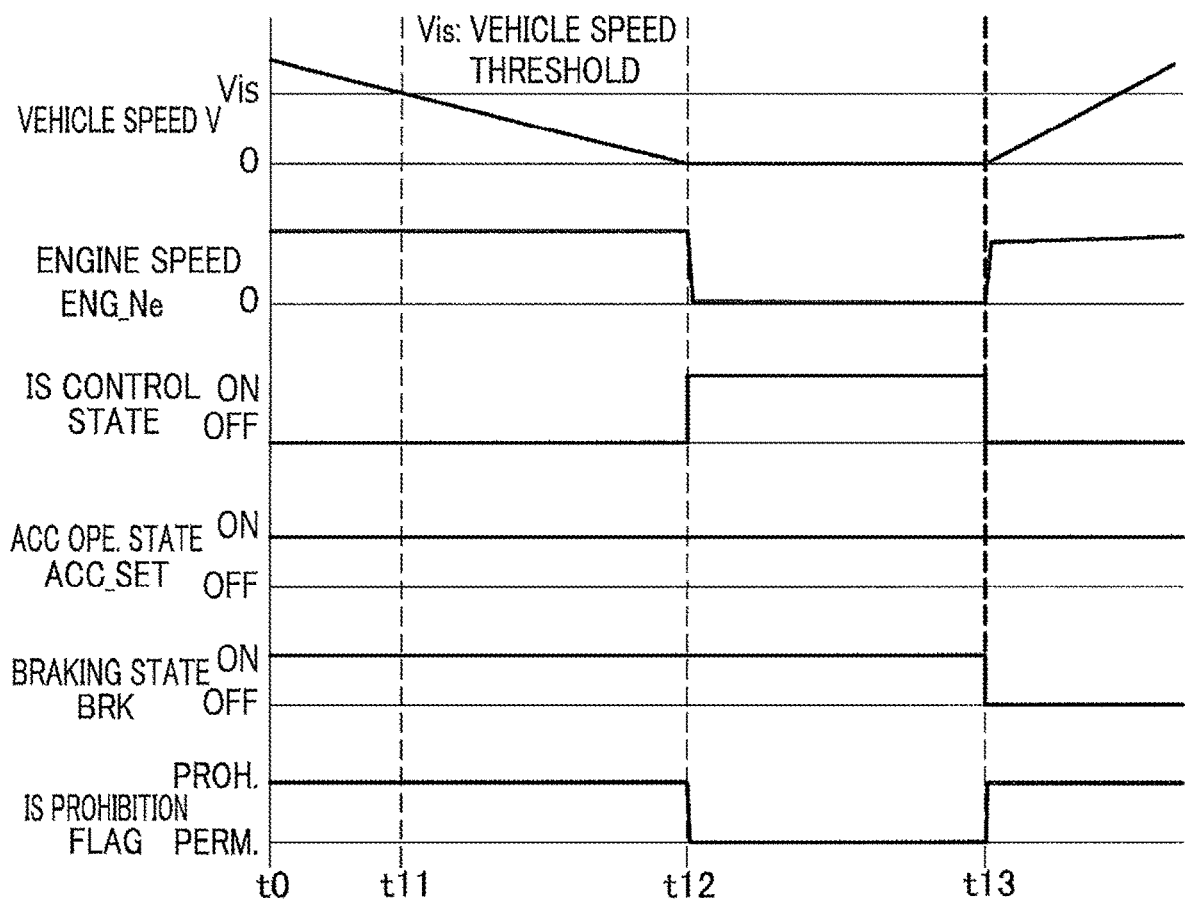

FIG. 5 is a time chart respectively showing changes overtime of the vehicle speed, the engine speed, the IS control state, the ACC_SET state, the braking state BRK, and the idling stop prohibition flag served for explanation of the operation of the vehicle controlling device 11 at the time when the adaptive cruise control (ACC) function is on.

At time t0 to t11 shown in FIG. 5, the vehicle speed V of the host vehicle linearly gradually decreases from a value exceeding the vehicle speed threshold Vis until the vehicle speed V enters the low vehicle speed range in which the vehicle speed threshold Vis is the upper limit. At this time, the engine speed ENG_Ne maintains the idling rotation speed. The IS control state is in the OFF state. The ACC operation state ACC_SET is in the ON state. The braking state BRK is in the ON state (the state in which the brake pedal is stepped in). The IS prohibition flag is in the prohibition state.

At time t11 to t12, even after entering, at time t11, the low vehicle speed range in which the vehicle speed threshold Vis is the upper limit, the vehicle speed V of the host vehicle linearly gradually decreases until the vehicle speed V decreases to zero (the stopped state) at time t12. At this time, the engine speed ENG_Ne continues to maintain the idling rotation speed. The IS control state maintains the OFF state. The ACC operation state ACC_SET is in the ON state. The braking state BRK is in the ON state (the state in which the brake pedal is stepped in). The IS prohibition flag maintains the prohibition state.

What should be noted is that, at time t11 to t12, although the vehicle speed V of the host vehicle enters the low vehicle speed range, the drive stop of the engine 69 is not performed and the engine speed ENG_Ne maintains the idling rotation speed. Such action is realized because the IS prohibition flag is maintained in the prohibition state on the premise that the ACC operation state ACC_SET is in the ON state at the same time t11 to t12.

At time t12 to t13, the vehicle speed V of the host vehicle maintains zero (the stopped state). At this time, the engine speed ENG_Ne decreases to zero at a time immediately after time t12 and thereafter maintains the zero state (the drive stop state of the engine 69). The IS control state transitions from the OFF state to the ON state and thereafter maintains the ON state. The ACC operation state ACC_SET is in the ON state. The braking state BRK is in the ON state (the state in which the brake pedal is stepped in). The IS prohibition flag transitions from the prohibition state to the permission state and thereafter maintains the permission state.

What should be noted is that the drive stop of the engine 69 is performed after the vehicle speed V of the host vehicle decreases to zero (the stopped state) at time t12 to t13. Such action is realized because the IS prohibition flag transitions from the prohibition state to the permission state on the premise that the ACC operation state ACC_SET is in the ON state at the same time t12 to t13.

At time t13 and subsequent time, the vehicle speed V of the host vehicle linearly gradually increases from zero (the stopped state). At this time, the engine speed ENG_Ne increases to the idling rotation speed at a time immediately after time t13 and thereafter maintains speed near the idling rotation speed. The IS control state transitions from the ON state to the OFF state at time t13 and thereafter maintains the OFF state. The ACC operation state ACC_SET is in the ON state. The braking state BRK transitions from the ON state (the state in which the brake pedal is stepped in) to the OFF state (the state in which the foot is released from the brake pedal) at time t13 and thereafter maintains the OFF state. The IS prohibition flag transitions from the permission state to the prohibition state at time t13 and thereafter maintains the prohibition state.

Action and Effects Achieved by the Vehicle Controlling Device 11 According to the Embodiment of the Present Invention Action and effects achieved by the vehicle controlling device according to the embodiment of the present invention are explained.

The vehicle controlling device 11 based on a first aspect includes the VSA-ECU (the deceleration control unit) 57 that performs deceleration control of the host vehicle using an inter-vehicle distance between the host vehicle and another vehicle traveling in front of the host vehicle and the engine control unit 67 that performs idling stop control of stopping drive of the engine 69, which is the driving source, of the host vehicle upon satisfying a stop condition including entry of the vehicle speed V of the host vehicle into a predetermined low vehicle speed range and performs restart control of restarting the engine 69 upon satisfying a predetermined restart condition. A power supply 43 used in executing the deceleration control and the power supply 43 used in executing the restart control share one power supply 43 mounted on the host vehicle. The engine control unit 67 adopts configuration for prohibiting execution of the idling stop control during execution of the deceleration control.

As a premise, both of a deceleration request by the deceleration control and a restart request for the engine 69 require relatively large power to meet the requests. Therefore, when the power supply 43 used in executing the deceleration control and the power supply 43 used in executing the restart control share one power supply 43 mounted on the host vehicle and the deceleration request and the restart request are concurrently generated, it is likely that the capacity of the power supply 43 runs short and cannot meet one of the requests to cause the occupant to feel discomfort.

In this regard, in the vehicle controlling device 11 based on the first aspect, since the engine control unit 67 prohibits execution of the idling stop control during execution of the deceleration control, the drive of the engine 69 is not stopped during the execution of the deceleration control. Therefore, the deceleration request by the deceleration control and the restart request for the engine 69 are not concurrently generated.

With the vehicle controlling device 11 based on the first aspect, it is possible to avoid a situation in which the deceleration request by the deceleration control and the restart request for the engine are concurrently generated and realize smooth vehicle control without causing the occupant to feel discomfort. Since a sum of loads on the power supply 43 can be suppressed, it is also possible to expect a secondary effect of reducing the capacity of the power supply 43 (achieving a reduction in the weight of the power supply 43).

The vehicle controlling device 11 based on a second aspect may adopt, in the vehicle controlling device 11 based on the first aspect, configuration in which the engine control unit 67 permits execution of the idling stop control when the host vehicle is in the stopped state.

In the vehicle controlling device 11 based on the second aspect, the engine control unit 67 permits execution of the idling stop control when the host vehicle is in the stopped state. Even if the deceleration control is being executed, after the host vehicle is in the stopped state, the deceleration request by the deceleration control is no longer generated. Therefore, even if the restart request for the engine 69 is generated by executing the idling stop control after the host vehicle is in the stopped state, the deceleration request by the deceleration control is not generated.

With the vehicle controlling device 11 based on the second aspect, in addition to the effects of the vehicle controlling device 11 based on the first aspect, it is also possible to expect an effect of reducing a fuel consumption amount.

The vehicle controlling device 11 based on a third aspect may adopt configuration in which, in the vehicle controlling device 11 based on the first aspect, the VSA-ECU (the deceleration control unit) 57 performs deceleration control of the host vehicle using a difference between a preset demanded inter-vehicle distance and an actual inter-vehicle distance between the host vehicle and another vehicle traveling in front of the host vehicle and the engine control unit 67 further performs acceleration control of the host vehicle using the difference between the demanded inter-vehicle distance and the actual inter-vehicle distance and prohibits execution of idling stop control during execution of following control including the deceleration control and the acceleration control.

With the vehicle controlling device 11 based on the third aspect, the engine control unit 67 prohibits execution of the idling stop control during execution of the ACC control (the following control) including the deceleration control and the acceleration control. Therefore, it is possible to avoid a situation in which a deceleration request by the ACC control (the following control) and a restart request for the engine are concurrently generated and realize smooth vehicle control without causing the occupant to feel discomfort. Since a sum of loads on the power supply 43 can be suppressed, it is also possible to expect a secondary effect of reducing the capacity of the power supply 43 (achieve a reduction in the weight of the power supply 43).

The vehicle controlling device 11 based on a fourth aspect may adopt configuration in which the vehicle controlling device 11 includes the VSA-ECU (the deceleration control unit) 57 that performs deceleration control of the host vehicle using a difference between a preset demanded inter-vehicle distance and an actual inter-vehicle distance between the host vehicle and another vehicle traveling in front of the host vehicle and the engine control unit 67 that performs idling stop control of stopping drive of the engine 69 as a driving source of the host vehicle upon satisfying stop conditions including a condition that vehicle speed of the host vehicle enters a predetermined low vehicle speed range and performs restart control of restarting the engine 69 upon satisfying a predetermined restart condition, the power supply 43 used in executing the deceleration control and the power supply 43 used in executing the restart control share one power supply 43 mounted on the host vehicle, and the engine control unit 67 further performs acceleration control of the host vehicle using the difference between the demanded inter-vehicle distance and the actual inter-vehicle distance and prohibits execution of idling stop control during execution of following control including the deceleration control and the acceleration control.

In the vehicle controlling device 11 based on the fourth aspect, the engine control unit 67 performs the deceleration control and the acceleration control of the host vehicle using the difference between the demanded inter-vehicle distance and the actual inter-vehicle distance and prohibits execution of the idling stop control during execution of the following control including the deceleration control and the acceleration control.

With the vehicle controlling device 11 based on the fourth aspect, execution of the idling stop control is prohibited during execution of the ACC control (the following control) including the deceleration control and the acceleration control. Therefore, it is possible to avoid a situation in which a deceleration request by the ACC control (the following control) and a restart request for the engine are concurrently generated and realize smooth vehicle control without causing the occupant to feel discomfort.

Since a sum of loads on the power supply 43 can be suppressed, it is also possible to expect a secondary effect of reducing the capacity of the power supply 43 (achieving a reduction in the weight of the power supply 43).

A vehicle based on a fifth aspect includes the vehicle controlling device 11 based on anyone of the first to fourth aspects.

With the vehicle based on the fifth aspect, it is possible to provide the vehicle that avoids a situation in which a deceleration request by the following control and a restart request for the engine are concurrently generated and is capable of realizing smooth vehicle control without causing the occupant to feel discomfort.

Other Embodiments

Multiple embodiments explained above indicate examples of realization of the present invention. Therefore, the technical scope of the present invention should not be limitedly interpreted by the embodiments. This is because the present invention can be carried out in various forms without departing from the gist and main feature of the present invention.

For example, in the explanation of the vehicle controlling device 11 according to the embodiment of the present invention, an example is explained in which the function of generating a control signal (an IS prohibition flag) for permitting or prohibiting a drive stop of the engine 69 is allocated to the engine control unit 67 of the ENG-ECU 53. However, the present invention is not limited to this example.

The present invention may adopt configuration in which the function of generating a control signal (an IS prohibition flag) for permitting or prohibiting a drive stop of the engine 69 is allocated to the vehicle controlling device 11 itself instead of the engine control unit 67 of the ENG-ECU 53. In this case, the vehicle controlling device 11 is equivalent to an "engine control unit" of the present invention.

In the explanation of the vehicle controlling device 11 according to the embodiment of the present invention, an example is explained in which the function of performing deceleration control of the host vehicle using an inter-vehicle distance between the host vehicle and another vehicle traveling in front of the host vehicle is allocated to the VSA-ECU 57. However, the present invention is not limited to this example.

The present invention may adopt configuration in which the function of performing deceleration control of the host vehicle using an inter-vehicle distance between the host vehicle and another vehicle traveling in front of the host vehicle is allocated to the vehicle controlling device 11 itself instead of the VSA-ECU 57. In this case, the vehicle controlling device 11 is equivalent to a "deceleration control unit" of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A vehicle controlling device comprising:
    a deceleration controller that performs deceleration control of a host vehicle using an inter-vehicle distance between the host vehicle and another vehicle traveling in front of the host vehicle; and
    an engine controller that performs idling stop control of stopping drive of an engine as a driving source of the host vehicle upon satisfying stop conditions including a condition that vehicle speed of the host vehicle enters a predetermined low vehicle speed range and performs restart control of restarting the engine upon satisfying a predetermined restart condition, wherein
    a power supply mounted on the host vehicle is used for executing the deceleration control and the restart control,
    the engine controller prohibits execution of the idling stop control during execution of the deceleration control,
    the deceleration controller performs the deceleration control of the host vehicle using a difference between a preset demanded inter-vehicle distance and an actual inter-vehicle distance between the host vehicle and another vehicle traveling in front of the host vehicle,
    the engine controller further performs acceleration control of the host vehicle using the difference between the demanded inter-vehicle distance and the actual inter-vehicle distance, and
    the engine controller prohibits execution of the idling stop control during execution of following control including the deceleration control and the acceleration control.

2. The vehicle controlling device according to claim 1, wherein the engine controller permits execution of the idling stop control when the host vehicle is in a stopped state.

3. A vehicle comprising the vehicle controlling device according to claim 1.

4. A vehicle comprising the vehicle controlling device according to claim 2.

* * * * *